US009408042B2

(12) United States Patent
Stubbs

(10) Patent No.: US 9,408,042 B2
(45) Date of Patent: Aug. 2, 2016

(54) LOCATION-BASED OPERATIONAL CONTROL OF A TRANSMITTER

(71) Applicant: Clear Channel Communications, Inc., San Antonio, TX (US)

(72) Inventor: Michael L. Stubbs, Conifer, CO (US)

(73) Assignee: iHeartCommunications, Inc., San Antonio, TX (US)

(*) Notice: Subject to any disclaimer, the term of this patent is extended or adjusted under 35 U.S.C. 154(b) by 740 days.

(21) Appl. No.: 13/803,314

(22) Filed: Mar. 14, 2013

(65) Prior Publication Data
US 2016/0050542 A1  Feb. 18, 2016

(51) Int. Cl.
H04B 7/14    (2006.01)
H04B 7/185   (2006.01)
H04W 4/04    (2009.01)
H04L 29/08   (2006.01)
H04W 4/02    (2009.01)

(52) U.S. Cl.
CPC ............ *H04W 4/046* (2013.01); *H04B 7/185* (2013.01); *H04L 67/2852* (2013.01); *H04W 4/021* (2013.01)

(58) Field of Classification Search
USPC ........... 455/422.1, 436, 437, 440, 456.1, 427, 455/439, 456.3
See application file for complete search history.

(56) References Cited

U.S. PATENT DOCUMENTS

| | | | |
|---|---|---|---|
| 7,069,026 B2* | 6/2006 | McClure | 455/456.3 |
| 7,860,516 B2 | 12/2010 | Hodges et al. | |
| 8,041,660 B2 | 10/2011 | Stehle et al. | |
| 8,170,580 B2 | 5/2012 | Dingler et al. | |
| 8,369,775 B2* | 2/2013 | Karabinis et al. | 455/12.1 |
| 8,705,438 B2* | 4/2014 | Laroia et al. | 370/328 |
| 2005/0221841 A1 | 10/2005 | Piccionelli et al. | |
| 2009/0264134 A1* | 10/2009 | Xu et al. | 455/437 |
| 2010/0042940 A1 | 2/2010 | Monday et al. | |
| 2011/0148634 A1 | 6/2011 | Putz | |
| 2011/0256881 A1 | 10/2011 | Huang et al. | |
| 2014/0225767 A1* | 8/2014 | Cordone | 342/352 |

* cited by examiner

*Primary Examiner* — Blane J Jackson
(74) *Attorney, Agent, or Firm* — Toler Law Group, PC

(57) ABSTRACT

A method includes receiving location information from a Global Positioning System receiver, retrieving geo-fence data from a geo-fence database corresponding to a boundary of a jurisdiction, automatically selecting between a first or second frequency band satellite transmitter based on the comparison.

16 Claims, 6 Drawing Sheets

LOCATION-BASED OPERATIONAL CONTROL OF A TRANSMITTER

BACKGROUND

Satellite systems may communicate using various bands of the electromagnetic spectrum. Each band has various advantages and disadvantages. For instance, conventional band (C-band) transmissions may be less affected by adverse weather conditions than Kurz-unten band ($K_u$-band) transmissions, but the power level of C-band transmissions is restricted in various jurisdictions. If a satellite transmitter moves into a jurisdiction and is utilizing a band in a manner that is restricted in the jurisdiction, an operator of the satellite transmitter (or an operator of the vehicle that uses the satellite transmitter) may face a fine levied by the jurisdiction. To avoid such fines, an operator of a satellite transmitter may switch between bands (e.g., C-band and $K_u$-band) depending on a location of the satellite transmitter (or the location of a vehicle including the satellite transmitter). Manual switching between satellite bands may be unreliable, because an operator may forget to switch transmitters when crossing a border into a regulated area (e.g., a ship that crosses from international waters into waters of a particular country).

SUMMARY

Disclosed are systems and methods for automatically adjusting satellite transmissions based on a location of a vehicle. The system may be located, at the vehicle, or remote from the vehicle, and the method may be performed on-board the vehicle or performed remotely. For example, a computer (on board the vehicle or remote from the vehicle) may automatically select a particular satellite transmission band based on a measured location of the vehicle.

In a particular embodiment, a method includes receiving geo-fence data corresponding to a boundary of a jurisdiction at a satellite antenna controller. The method also includes comparing location data (e.g., as determined by a GPS receiver) and the geo-fence data. The satellite antenna controller is configured to determine operational parameters, such as a transmission frequency band. The satellite antenna controller may direct actions of one or more satellite transmitters based on the operational parameters.

In another particular embodiment, a method includes receiving location data and geo-fence data at a satellite hub (e.g., a hub station). Based on a comparison of the location data and the geo-fence data, the satellite hub may issue commands to a satellite antenna controller defining operational parameters (e.g., a frequency band for transmission) of the satellite antenna controller. For example, the satellite antenna controller may be located on board a vehicle and the satellite antenna controller may receive commands from a satellite hub that is remote from the vehicle.

In another particular embodiment, a processor may execute computer instructions to perform operations including receiving, at a satellite hub, location data from a satellite antenna controller. The satellite antenna controller is coupled to a first frequency band satellite transmitter and to a second frequency band satellite transmitter of a vehicle. The operations may further include receiving data related to the satellite antenna controller, and/or data related to a vehicle that carries the satellite controller and the satellite transmitters, while the vehicle is en route. The data may include a location of the vehicle, a satellite band being used for transmission, or a combination thereof. The operations may further include storing the data in memory and evaluating the data. The operations further include determining whether a geo-fence database on-board the vehicle is up to date. When the geo-fence database on-board the vehicle is not up to date, the geo-fence database on-board the vehicle is updated by sending commands or data from the satellite hub to the satellite antenna controller.

DETAILED DESCRIPTION

Figure 1:
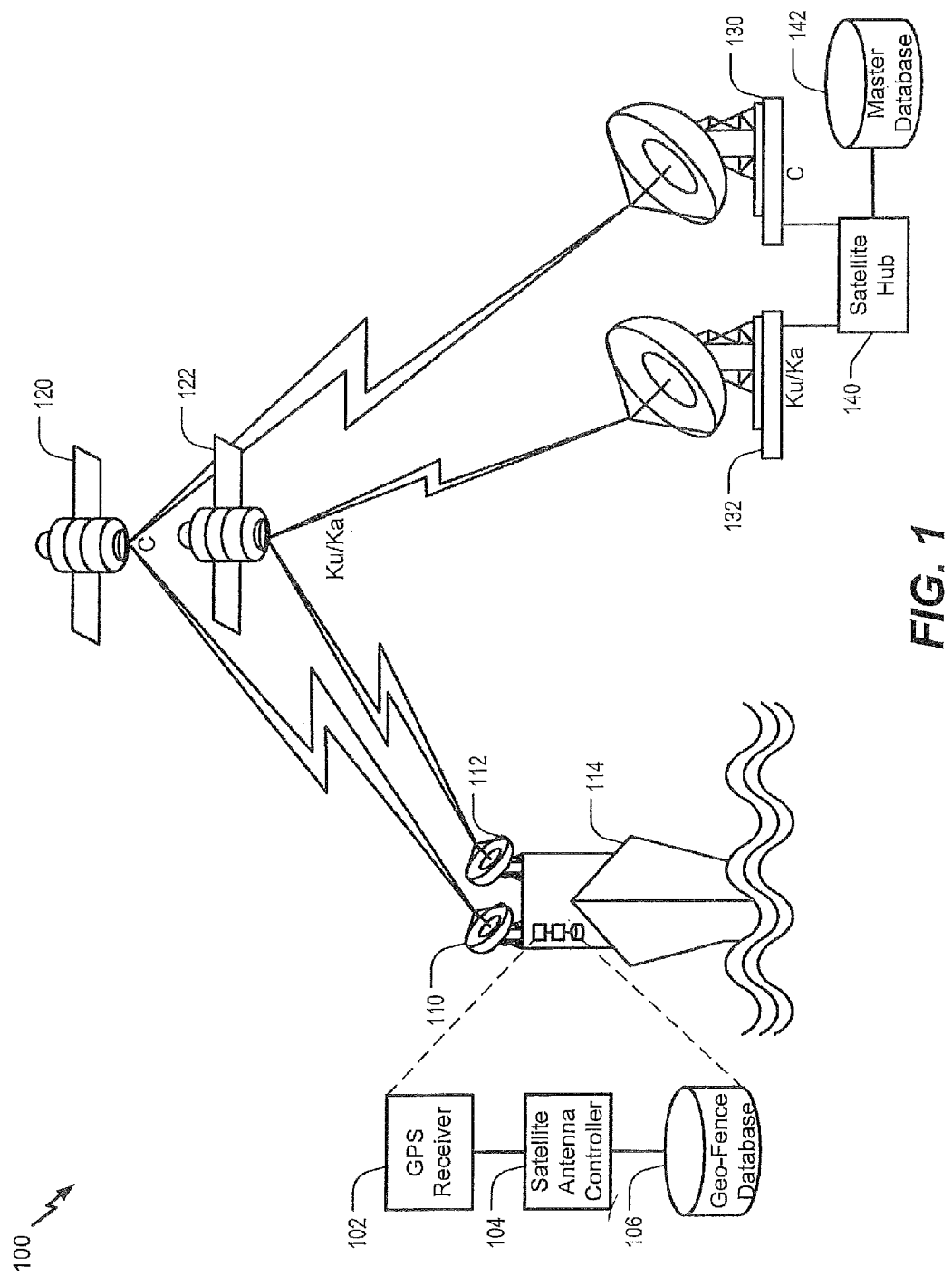
FIG. 1 is a diagram of a first embodiment of a system that is operable to control operation of multiple satellite transmitters.

Referring to FIG. 1, an illustrative embodiment of a system 100 is shown. FIG. 1 also illustrates a vehicle 114. The vehicle 114 in the illustrated embodiment is a ship that is sailing at sea, such as a cruise ship or a freighter. However, the vehicle 114 may be any type of vehicle, such as a car, a train, an airplane, a blimp, etc., that can communicate via satellites.

The vehicle 114 includes a satellite antenna controller 104 coupled to a Global Positioning System (GPS) receiver 102. The satellite antenna controller 104 may be implemented by a computing device including a processor and memory that stores computer instructions (e.g., software or firmware). In other embodiments, the satellite antenna controller 104 may be implemented by hardware. In an alternative embodiment, the GPS receiver 102 may be replaced by another locating system, such as a system that triangulates location based on radio waves, radar, microwaves, point-to-point communication, or any combination thereof.

The satellite antenna controller 104 is coupled to a first frequency band satellite transmitter 110 and to a second frequency band satellite transmitter 112. For example, the first frequency band satellite transmitter 110 may be a C-band satellite transmitter and may communicate via a C-band satellite link, and the second frequency band satellite transmitter 112 may be a $K_u/K_a$-band satellite transmitter that may communicate via a $K_u/K_a$-band satellite link.

Alternatively, the first frequency band satellite transmitter 110 and the second frequency band satellite transmitter 112 may be transceivers or other devices capable of both sending and receiving signals. In a particular embodiment, the first frequency band satellite transmitter 110 may be a C-band small aperture terminal (CSAT) type satellite transmitter, and the second frequency band satellite transmitter 112 may be a very small aperture terminal (VSAT) type satellite transmitter. The vehicle 114 may further include a C-band receiver and a $K_u/K_a$-band receiver.

The vehicle 114 includes a geo-fence database 106 coupled to the satellite antenna controller 104. The geo-fence database 106 may be a multi-dimensional database that stores local frequency coordinator rules or laws, geo-location detection, frequency, preferred modes, or any combination thereof. The rules may include regulations or a logic-tree.

The first frequency band satellite transmitter 110 communicates via a first satellite 120 to a C-band transceiver 130. Similarly, the second frequency band satellite transmitter 112 communicates via a second satellite 122 to a $K_u/K_a$-band transceiver 132. The satellites 120, 122 may be in geosynchronous orbit or geostationary orbit.

The system 100 further includes a satellite hub 140. The satellite hub 140 is coupled to or includes the C-band transceiver 130 and the $K_u/K_a$-band transceiver 132. In an alternative embodiment, one or both of the transceivers 130 and 132 may be replaced with a separate transmitter and receiver. The satellite hub 140 also includes, or has access to, a master database 142. The satellite hub 140 may be located on land or at some other fixed location, such as at an oil platform.

During operation, the satellite antenna controller 104 may receive location information from the GPS receiver 102. The location information may identify a position of the vehicle 114. Based on the location information, the satellite antenna controller 104 may retrieve geo-fence data from the geo-fence database 106. The geo-fence data may represent, correspond to, or otherwise indicate, a boundary of a jurisdiction. For example, the geo-fence data may represent a maritime boundary that corresponds to a demarcation between international waters and waters of a particular country. As another example, the geo-fence data may represent a boundary within a jurisdiction that has particular rules governing radio transmissions. To illustrate, in the United States (U.S.), C-band transmissions are regulated within 200 kilometers (km) of the U.S. coastline. For example, C-band transmissions within 200 km of the U.S. coastline are required to be within a small range of frequencies and are required to be coordinated (e.g., according to a regulatory process) to prevent interference.

In addition, or in the alternative, the geo-fence data may represent two boundaries that define an intended route of the vehicle 114, such as a shipping lane. The intended route may be set by an operator of the vehicle 114 at any time, including while the vehicle 114 is en route. Alternatively, the intended route may be received from the satellite hub 140 at any time, including while the vehicle 114 is en route.

The satellite antenna controller 104 may compare the location data received from the GPS receiver 102 and the geo-fence data retrieved from the geo-fence database 106. Depending on the location of the vehicle 114, the comparison may indicate that the vehicle 114 is about to cross a boundary into a jurisdiction. The satellite antenna controller 104 may automatically determine operating parameters to conform to the jurisdiction's requirements before the vehicle 114 enters the jurisdiction. The operating parameters may include satellite frequency band information, such as a selection between transmitting data using the first frequency band satellite transmitter 110 or the second band frequency satellite transmitter 112. The operating parameters may further define particular transmit and receive frequencies, a symbol rate, a modulation type, a forward error correction configuration, a carrier power level, or any combination thereof, to be used by the vehicle 114 for subsequent data transmission and for processing.

In a particular embodiment, the comparison performed by the satellite antenna controller 104 includes determining whether the vehicle 114 is within a threshold distance of a boundary of a jurisdiction. For example, the geo-fence data may correspond to a geo-fence defined by a set of coordinates representing the boundary of the jurisdiction. Alternatively, the set of coordinates may represent a "fence" that is a threshold distance away from the boundary of the jurisdiction. When the comparison indicates that the vehicle 114 is within the threshold distance from the boundary, the satellite antenna controller 104 may select operating parameters according to rules associated with the geo-fence data (e.g., rules corresponding to a particular jurisdiction). For example, the satellite antenna controller 104 may select the second frequency band satellite transmitter 112 (for $K_u/K_a$ band transmission) when the vehicle 114 is within the threshold distance (e.g., 2 miles) of the boundary (e.g., 200 km from the U.S. coast) and may select the first frequency band satellite transmitter 110 (for C-band transmission) when the vehicle 114 is not within the threshold distance of the boundary. In a particular embodiment, the comparison may indicate that the vehicle 114 has crossed the boundary and entered the jurisdiction.

Once the satellite antenna controller 104 has determined the operating parameters, the satellite antenna controller 104 may select the first frequency band satellite transmitter 110 or the second frequency band satellite transmitter 112 based on the operating parameters. The satellite antenna controller 104 may also search for a corresponding satellite (e.g., the satellite 120 or the satellite 122) based on a priority. Further, the satellite antenna controller 104 may automatically position an antenna array and continue to search for the selected satellite until communication is established with the satellite hub 140. For example, there may be multiple compatible satellites operating on a frequency band used by the selected satellite transmitter. The satellite antenna controller 104 may automatically control an antenna array to scan the sky for satellites and to build a list of the compatible satellites. The satellite antenna controller may then select a particular compatible satellite based on a priority (e.g., signal strength, distance, etc.) and point the antenna array toward the selected compatible satellite. Transmissions from the vehicle 114 are made via the selected transmitter according to the operating parameters. Thus, the satellite antenna controller 104 may mitigate monetary fines by automatically changing operational parameters (e.g., transmission frequency band and power level) to conform to laws and regulations of a jurisdiction before the vehicle crosses into the jurisdiction.

For example, the vehicle 114 may transmit over the C-band via the first frequency band satellite transmitter 110 when at sea, because C-band transmissions are less prone to rain fade. However, various countries have laws and regulations governing satellite transmissions. Such laws and regulations may apply in particular areas of or near each country. For example, within 200 km of the U.S., C-band transmissions must be coordinated. Operating an uncoordinated C-band uplink within 200 km of the U.S. coastline may lead to fines from the Federal Communications Commission (FCC) or civil law suits. Ku/Ka transmissions do not have the same restriction in the U.S. and may be operated more freely. Therefore, the system 100 may avoid regulatory fees and civil liability by the satellite antenna controller 104 automatically switching from transmitting via the first frequency band satellite transmitter 110 (C-band) to transmitting via the second frequency band satellite transmitter 112 ($K_u/K_a$ band) when the comparison of the location data from the GPS receiver 102 and the geo-fence data from the geo-fence database 106 indicates that the vehicle 114 is approaching a location 200 km from the U.S. coastline. The location of the vehicle 114 may be compared to geo-fence data in real-time (or near real-time) or periodically (e.g., every minute, every hour, or according to a user defined period).

The satellite controller 104 may also perform automatic selection of a satellite band transmitter when the vehicle is leaving, or is about to leave, a jurisdiction. For example, when the vehicle is about to move (or has just moved) outside of the 200 km distance from the US coastline, the satellite controller 104 may automatically switch from using the $K_u/K_a$-band satellite transmitter 112 to using the C-band satellite transmitter 110.

In addition, the satellite antenna controller 104 may assist navigation by providing alerts when the vehicle 114 strays from an intended course. When the geo-fence data represents an intended route, the geo-fence data may include a first and a second geo-fence defined by a first and a second set of coordinates. When the location of the vehicle is not between the first and the second geo-fence, the comparison may indicate that the vehicle 114 has strayed from the intended route. When the comparison indicates that the vehicle 114 has strayed from the intended route, the satellite antenna controller 104 may generate an alert. The alert may be a warning displayed at a navigation system of the vehicle 114, a message sent to the satellite hub 140, an electronic message (e.g., e-mail or text message), a recorded message played over an audio system of the vehicle 114, an audible alarm, or some other mechanism for alerting operators of the vehicle 114 and/or operators of the satellite hub 140. For example, the alert may be used to notify an operator of the vehicle 114 or a fleet manager that the vehicle 114 has strayed from the intended route. In a particular embodiment, the route may be entirely included within a jurisdiction. For example, the route may be between two points in the US. In an alternate embodiment, the route may include places in multiple jurisdictions (e.g., a cruise route indicating that a cruise ship will visit ports in multiple countries, sail in international waters between ports, etc.).

Transmissions may be sent from the vehicle 114 to the satellite hub 140. For example, the satellite antenna controller 104 may send the location data received from the GPS receiver 102, information from the geo-fence database 106, and the operational parameters to the satellite hub 140. The satellite antenna controller 104 may also send indicators of received signal quality, such as signal strength, packet loss, etc. The satellite hub 140 may provide the received data to a regulatory authority. In a particular embodiment, the satellite antenna controller 104 transmits data to the satellite hub 140 in intervals. The frequency of the intervals may be determined by the regulatory authority. In some embodiments, the intervals occur once every fifteen minutes. Alternatively, the satellite antenna controller 104 may transmit the data to the satellite hub 140 in real-time or near real-time. The satellite antenna controller 104 may also transmit cached historical data (e.g., data captured and stored during a vehicle's trip from a starting location to a destination). The historical data may be used to resolve interference and boundary issues. For example, the historical data may indicate that the vehicle 114 is not responsible for radio interference experienced in a particular location or that the vehicle 114 did not enter the territorial waters of a particular nation.

In a particular embodiment, the satellite hub 140 may control operating parameters of the satellite antenna controller 104 by transmitting data via the C-band transceiver 130 and/or the $K_u/K_a$-band transceiver 132 to the satellite antenna controller 104. The data may include one or more commands instructing the satellite antenna controller 104 to set the operating parameters according to the commands. In a particular embodiment, the commands from the satellite hub 140 may indicate a selection between transmitting via the first frequency band satellite transmitter 110 and the second band frequency satellite transmitter 112. The commands may further indicate particular transmit and receive frequencies, a symbol rate, a modulation type, a forward error correction configuration, a carrier power level, or any combination thereof. The commands may be generated based on a comparison of the location data received from the satellite antenna controller 104 and geo-fence data retrieved by the satellite hub 140 from the master database 142.

The satellite hub 140 taking control of the operating parameters of the satellite antenna controller 104 may be in addition to, or an alternative to, the satellite antenna controller 104 determining the operating parameters. For example, the satellite antenna controller 104 may determine the operating parameters based on a comparison of location information and geo-fence data when the satellite antenna controller 104 is not in communication with the satellite hub 140. When the satellite antenna controller 104 is in communication with the satellite hub 140, the satellite hub 140 may monitor and control the operating parameters. Additionally, the satellite hub 140 may take control of other systems of the vehicle 114, such as entertainment systems.

In an exemplary embodiment, the comparison performed by the satellite hub 140 includes determining whether the vehicle 114 is within a threshold distance of a boundary represented by the geo-fence data received from the master database 142. In another illustrative example, the satellite hub 140 may retrieve data from the master database 142 and may transmit updated information to the satellite antenna controller 104. In a particular embodiment, transmission of the updated information may be based on a comparison of information from the geo-fence database 106 received from the satellite antenna controller 104 with corresponding information of the master database 142. For example, the information may include a version number or date. The satellite antenna controller 104 may update the geo-fence database 106 based on the data received from the satellite hub 140. For example, a regulatory authority may promulgate new regulations within an area and the master database 142 may be updated to reflect these changes. The satellite hub 140 may update the geo-fence database 106 from the master database 142 in response to the satellite hub 140 receiving geo-fence data from the satellite antenna controller 104 indicating that the geo-fence database 106 is out of date.

In a particular embodiment, the satellite hub 140 may communicate with a number of other vehicles in addition to the vehicle 114. The satellite hub 140 may receive data from and issue commands and geo-fence database updates to each of the vehicles. Thus, the satellite hub 140 may control satellite communications of a vehicle or a fleet of vehicles. Additionally, the satellite hub 140 may automatically adjust various parameters of systems within the vehicles, such as signal quality and throughput, position, speed, heading and operating parameters. The satellite hub 140 may alert personnel if the vehicle 114 (or other vehicles) deviates from an assigned route or area. Further, multiple satellite hubs may monitor and control multiple vehicles or multiple fleets of vehicles. For example, a first particular hub may monitor and control vehicles or fleets in the Atlantic Ocean, and a second particular hub may manage vehicles or fleets in the Pacific Ocean. Thus, a network of multiple hubs may monitor and control vehicles and fleets globally. Automatic control and monitoring of large numbers of vehicles across the world may enable operators to achieve significant time and cost savings by automatically adjusting a large number of systems to comply with a variety of jurisdictional rules.

Figure 2:
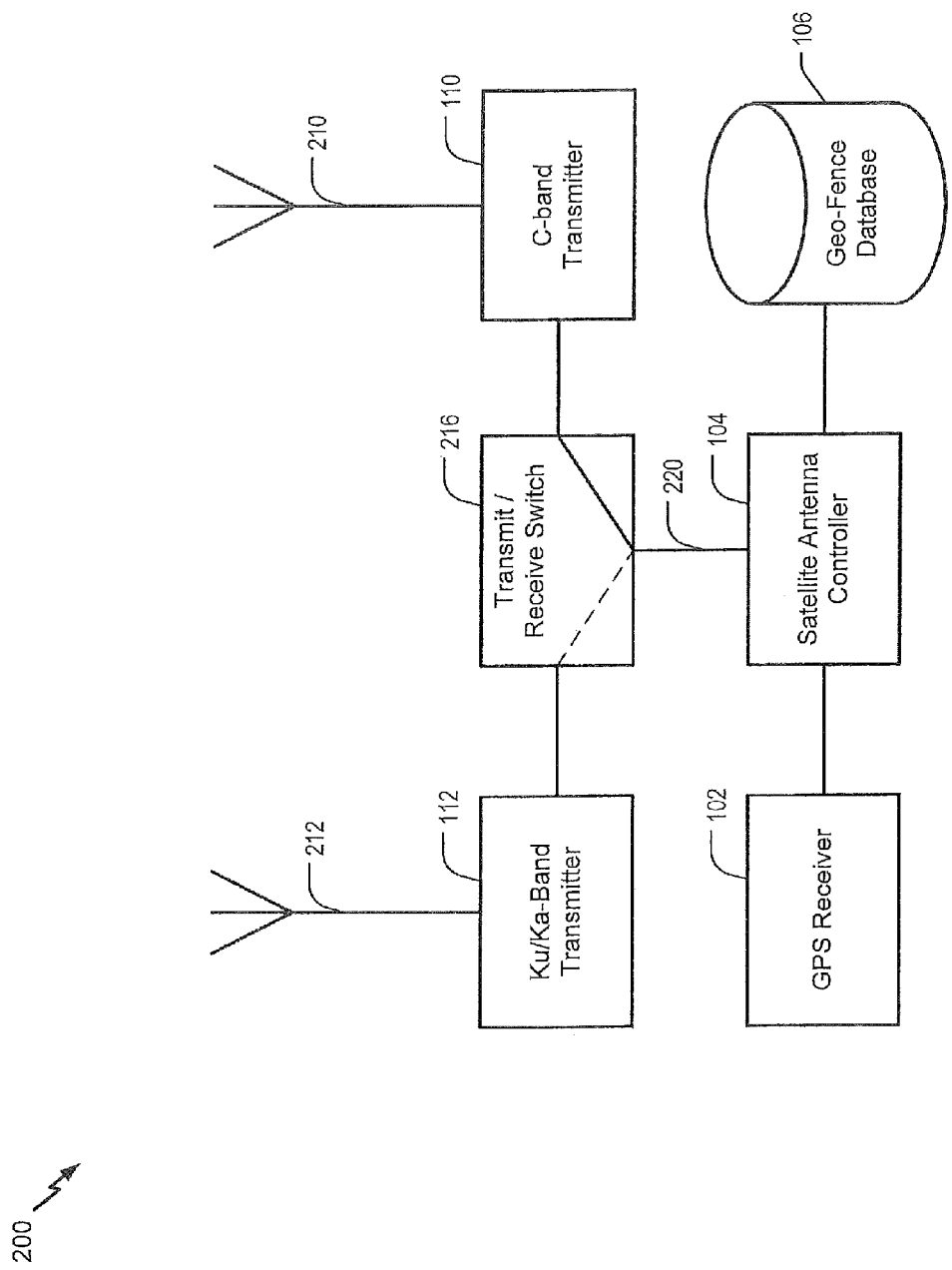
FIG. 2 is a diagram of a second embodiment of a system that is operable to control operation of multiple satellite transmitters.

Referring to FIG. 2, another particular illustrative embodiment of a system 200 that is operable to automatically change transmission characteristics based on location is shown. The system 200 includes various components illustrated in the system 100 of FIG. 1. The system 200 is located within a vehicle such as the vehicle 114 of FIG. 1. The system 200 includes the GPS receiver 102, the satellite antenna controller 104, the first frequency band (C-band) satellite transmitter 110, the second frequency band ($K_u/K_a$-band) satellite transmitter 112, and the geo-fence database 106. The system 200 also includes a transmit/receive switch 216. The transmit/receive switch 216 is coupled between the first frequency band satellite transmitter 110 and the second frequency band satellite transmitter 112 and is responsive to the satellite antenna controller 104, as shown. The first frequency band satellite transmitter 110 is coupled to a corresponding first antenna 210 and the second frequency band satellite transmitter 112 is coupled to a corresponding second antenna 212. In a particular embodiment, the first antenna 210 corresponds to a first satellite dish and the second antenna 212 corresponds to a second satellite dish. For example, the first antenna 210 may be implemented as a CSAT antenna and the second antenna 212 may be implemented as a VSAT antenna.

During operation, the satellite antenna controller 104 may receive location information from the GPS receiver 102 and geo-fence data from the geo-fence database 106. The geo-fence data may correspond to a jurisdictional boundary, a boundary within a jurisdiction where particular rules are in force, or an intended route. Alternatively, the geo-fence data may correspond to a boundary (or threshold) that is a particular distance from a jurisdictional boundary. The satellite antenna controller 104 may compare the location information to the geo-fence data in order to determine operating parameters. The operating parameters may include whether to select the first frequency band satellite transmitter 110 or the second frequency band satellite transmitter 112 for transmission. The operating parameters also include transmit and receive frequencies to be used, a symbol rate, a modulation type, a forward error correction configuration, a carrier power level, or any combination thereof. For example, the operating parameters may be determined based on the jurisdiction within which the vehicle 114 is located, based on the jurisdiction that the vehicle 114 is approaching, based on the selected satellite technology (e.g., C-band or $K_a/K_u$-band), or any combination thereof.

When the satellite antenna controller 104 selects the first frequency band satellite transmitter 110, the satellite antenna controller 104 may send a signal 220 to the transmit/receive switch 216 in order to select the first frequency band satellite transmitter 110 and to de-select the second frequency band satellite transmitter 112. After the transmit/receive switch 216 selects the first frequency band satellite transmitter 110, subsequent transmissions made by the system 200 are made via the first frequency band satellite transmitter 110 and the corresponding first antenna 210. Alternatively, when the satellite antenna controller 104 selects the second frequency band satellite transmitter 112, the transmit/receive switch 216 may disable the first frequency band satellite transmitter 110 and may enable the second frequency band satellite transmitter 112. In this case, subsequent transmissions made by the system 200 are made by the second frequency band satellite transmitter 112 and the corresponding second antenna 212.

The system 200 may enable an operator of a moving satellite communications system to mitigate fines by adjusting operating parameters to conform to laws and regulations of a jurisdiction. Additionally, the system 200 may alert the operator when the moving satellite communications system strays from an intended route.

Figure 3:
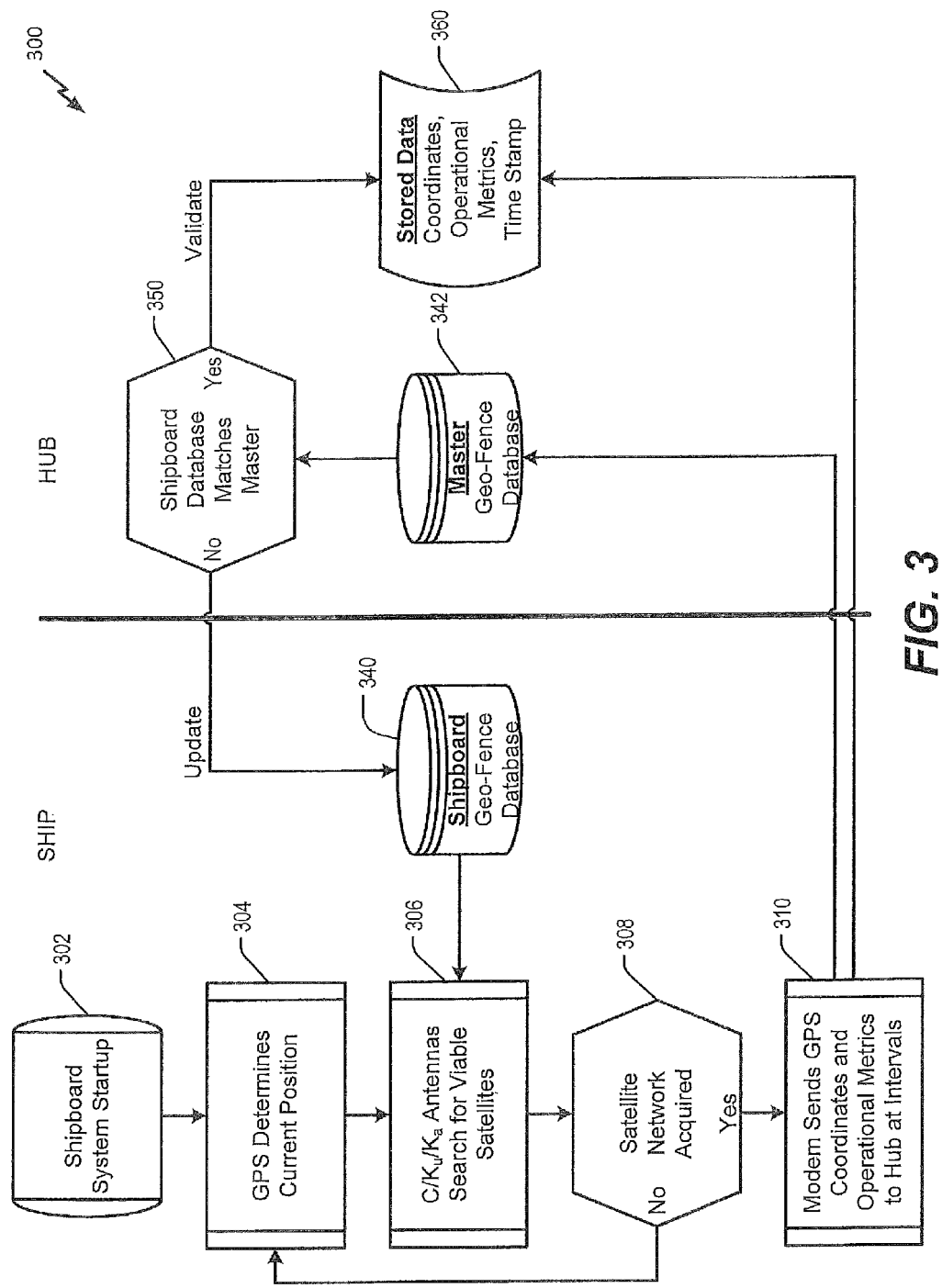
FIG. 3 is a flowchart that illustrates a first embodiment of a method of controlling operation of satellite transmitters.

Referring to FIG. 3, a particular illustrative embodiment of a method of selecting frequency band is depicted and generally designated 300. The method 300 may be performed by a communications system, such as the system 100 of FIG. 1. The method 300 includes starting up a shipboard system, at 302. The shipboard system may include the satellite antenna controller 104 of FIG. 1. The method 300 includes determining a current position using a GPS receiver, at 304. The GPS receiver may correspond to the GPS receiver 102 of FIG. 1. The method 300 also includes using C and $K_u/K_a$ antennas to search for viable satellites based on geo-fence data from a shipboard geo-fence database 340, at 306. The C and $K_u/K_a$ antennas may correspond to antennas 210, 212 of FIG. 2. Further, the shipboard geo-fence database 340 may correspond to the geo-fence database 106 of FIG. 1.

The method 300 determines whether a satellite network is acquired, at 308. When no satellite network is acquired, the method 300 returns to 304. When a satellite network is acquired, the method 300 proceeds to step 310, where a modem sends GPS coordinates and operational metrics to a master geo-fence database 342 (e.g., at a hub) and to a database 360. The operational metrics may include a transmit frequency band, transmit and receive frequencies, a symbol rate, modulation, a forward error correction configuration, a carrier power level, a receive signal quality, or any combination thereof. The hub may correspond to the satellite hub 140 of FIG. 1, and the master geo-fence database 342 may correspond to the master database 140 of FIG. 1.

Advancing to 350, the hub determines if the shipboard geo-fence database 340 matches the master geo-fence database 342. For example, the satellite hub 140 of FIG. 1 may determine if a version number or date of the geo-fence database 106 matches a version number or date of the master database 142. When the shipboard geo-fence database 340 matches the master geo-fence database 342, the hub validates the stored data. In addition, or in the alternative, data within the geo-fence database 106 (e.g., a record) may be validated based on corresponding data (e.g., a corresponding record) within the master database 142. When the shipboard geo-fence database does not match the master geo-fence database, the hub updates the shipboard geo-fence database and proceeds to step 306.

Figure 4:
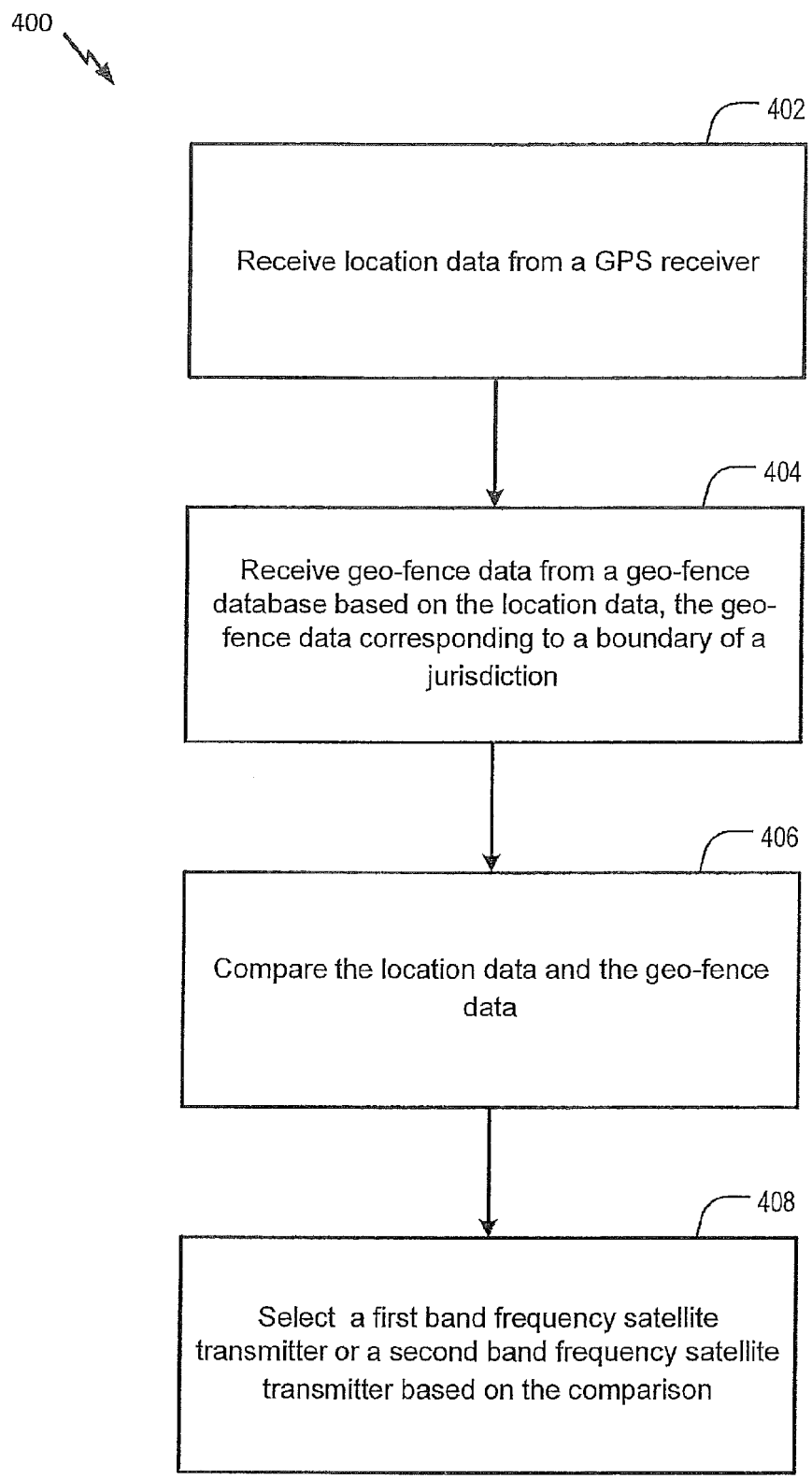
FIG. 4 is a flowchart that illustrates a second embodiment of a method of controlling operation of a satellite transmitters.

Referring to FIG. 4, a particular embodiment of a method 400 of automatically selecting a satellite antenna for transmission is shown. The method 400 may be performed by a satellite antenna controller, such as the satellite antenna controller 104 of FIG. 1. The method 400 includes receiving location information from a GPS receiver, at 402. For example, the satellite antenna controller 104 of FIG. 1 may receive location information from the GPS receiver 102. The method 400 further includes receiving geo-fence data from a geo-fence database based on the location information, at 404. The geo-fence data corresponds to a boundary jurisdiction. For example, the satellite antenna controller 104 of FIG. 1 may receive geo-fence data from the geo-fence database 106 based on the location information received from the GPS receiver 102. The geo-fence data may correspond to a boundary within which communications are regulated, such as 200 km from a shoreline of the U.S.

The method 400 includes comparing the location data and the geo-fence data, at 406. For example, the satellite antenna controller 104 of FIG. 1 may compare the location data and the geo-fence data to determine whether the location data indicates that the vehicle 114 is at a location within a particular threshold distance of the boundary described by the geo-fence data (e.g., a location approaching 200 km from the U.S. shoreline). The method 400 includes selecting between a first band satellite frequency transmitter and a second frequency band satellite transmitter based on the comparison, at 408. For example, the satellite antenna controller 104 of FIG. 1 may select the $K_a/K_u$-band transmitter 112 when the location data indicates that the vehicle 114 is near 200 km from the shoreline of the U.S. Furthermore, the satellite frequency transmitter 104 of FIG. 1 may select the C-band satellite transmitter 110 when the location data indicates that the vehicle 114 is outside of 200 km from the shoreline of the U.S. Thus, the method 400 may enable a vehicle to mitigate fines by automatically adjusting transmission parameters based on a location of the vehicle.

Figure 5:
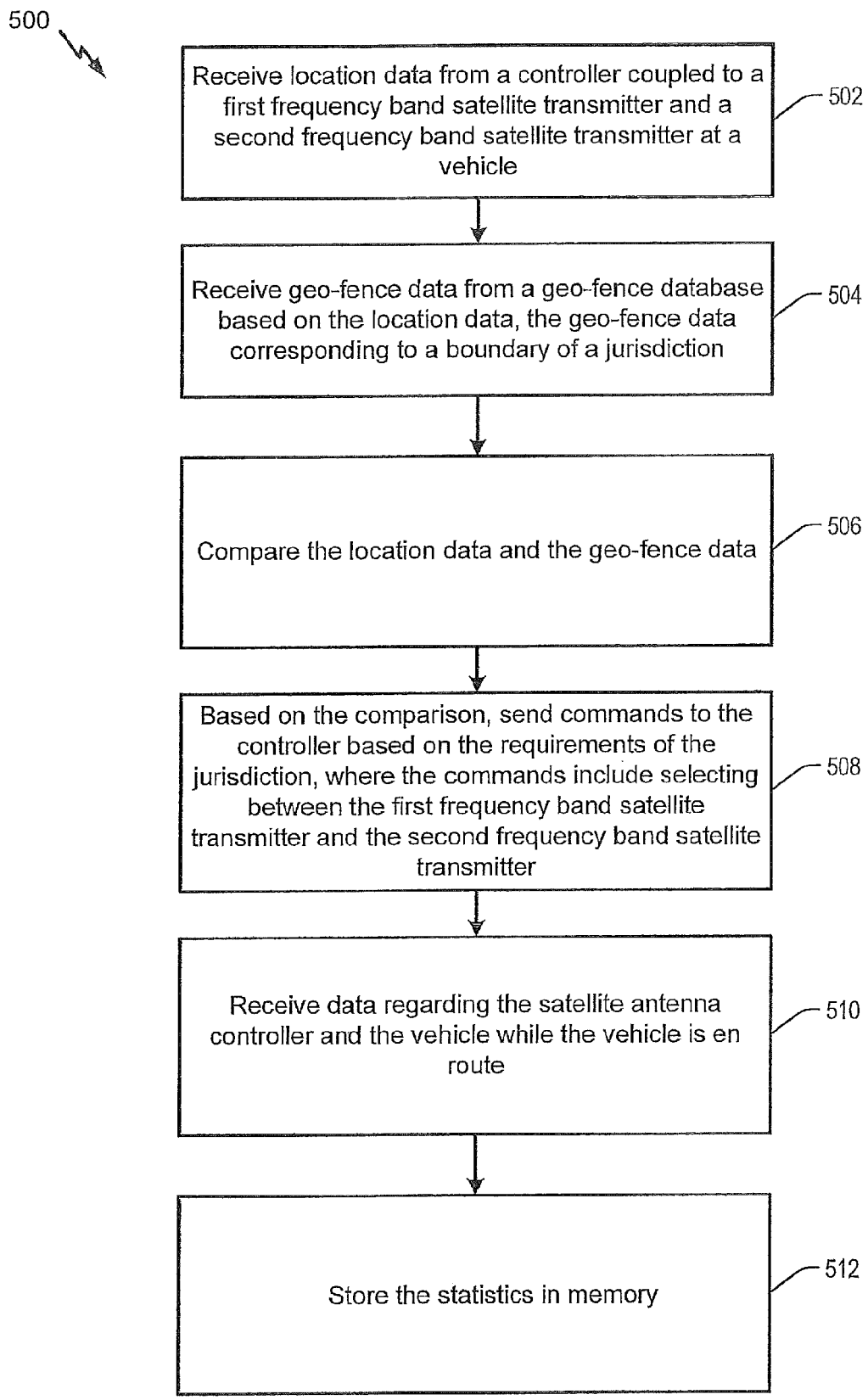
FIG. 5 is a flowchart that illustrates a third embodiment of a method of controlling operation of satellite transmitters.

Referring to FIG. 5, a method 500 for remotely managing a satellite antenna controller, such as the satellite antenna controller 104 FIG. 1, is shown. The method 500 includes receiving location information from a controller coupled to a first frequency band satellite transmitter and to a second frequency band satellite transmitter at a vehicle, at 502. For example, the satellite hub 140 of FIG. 1 may receive location information from the satellite antenna controller 104 of the vehicle 114. The method 500 further includes receiving geo-fence data from a geo-fence database based on the location information, at 504. The geo-fence data corresponds to a boundary of a jurisdiction, at 504. For example, the satellite hub 140 may receive geo-fence data based on the location information from the master database 142. The geo-fence data may correspond to a boundary of a jurisdiction.

The method 500 includes comparing the location data and the geo-fence data, at 506. For example, the satellite hub 140 may compare the location data and the geo-fence data to determine whether the vehicle 114 is within a threshold distance of the boundary described by (or corresponding to) the geo-fence data. The method 500 further includes, based on the comparison, sending commands to the controller based on the requirements of the jurisdiction, at 508. The commands indicate a selection between the first frequency band satellite transmitter and the second frequency band satellite transmitter. For example, when the vehicle 114 is within the threshold distance of the geo-fence, the satellite hub 140 may send a command to the satellite antenna controller 104 indicating that the satellite antenna controller 104 should select the $K_u/K_a$ band satellite transmitter 112. When the vehicle 114 is not within the threshold distance of the geo-fence, the satellite hub 140 may send a command to the satellite antenna controller 104 indicating that the satellite antenna controller 104 should select the C-band satellite transmitter 110.

The method 500 includes receiving data, while the vehicle is en route, from the controller, at 510. For example, the satellite hub 140 may receive GPS coordinates and operational metrics. The operational metrics may include a transmit frequency band, transmit and receive frequencies, a symbol rate, modulation, a forward error correction configuration, a carrier power level, a receive signal quality, or any combination thereof. The data may be received at particular intervals, such as once every fifteen minutes. Further, the intervals may be set by a regulatory authority of a jurisdiction. The method 500 includes storing the data in memory, at 512. For example, the satellite hub 140 may store the information received from the satellite antenna controller 104 in memory. The stored data (or derived data, such as reports or aggregated statistics) may be transmitted to the regulatory authority. Thus, the method 500 may enable a hub to mitigate fines incurred by vehicles of a fleet by automatically controlling transmission parameters of the vehicles and by automatically complying with reporting requirements of one or more jurisdictions.

Figure 6:
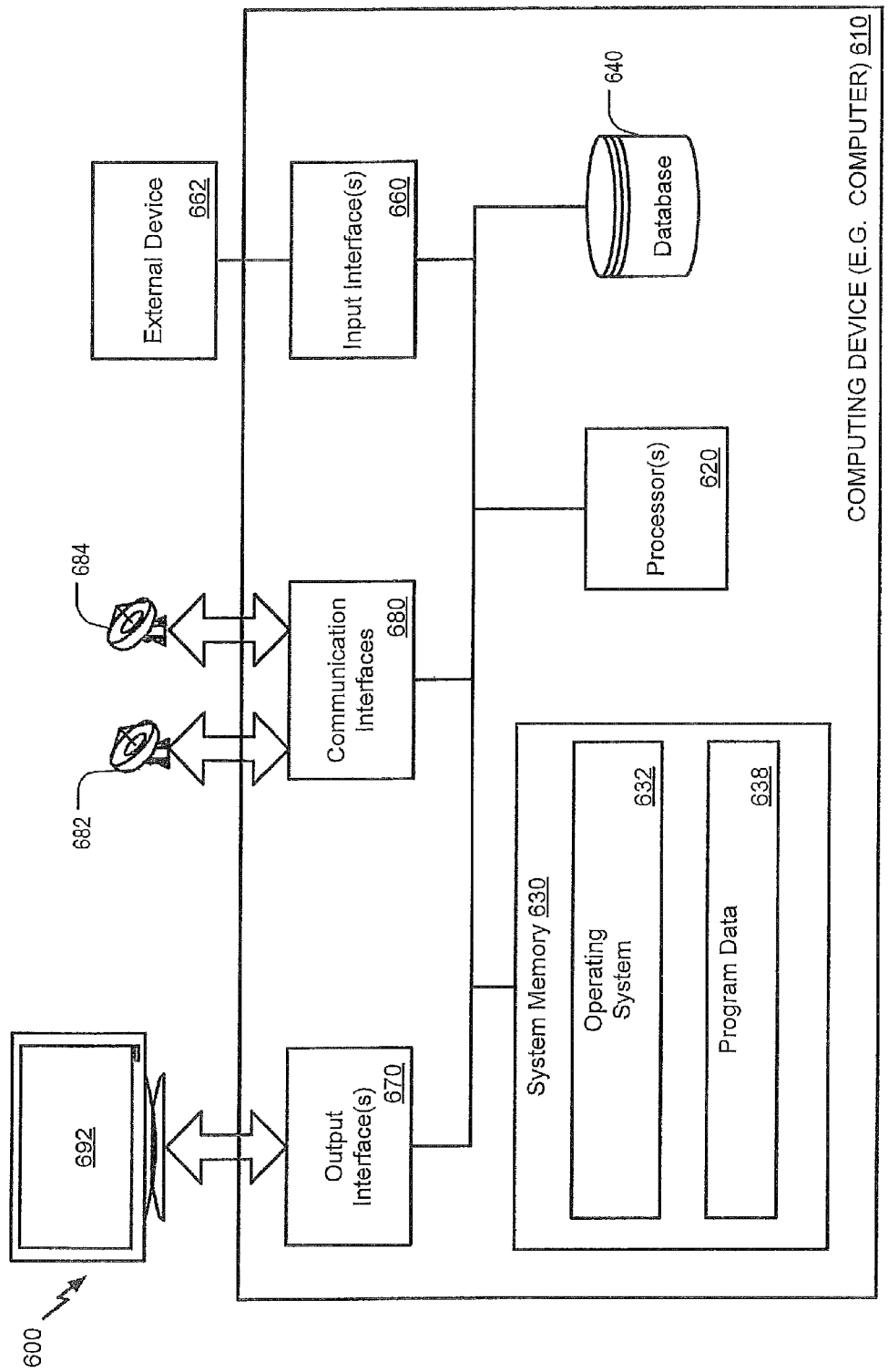
FIG. 6 is a block diagram of an illustrative embodiment of a general computer system operable to support embodiments of computer-implemented methods, computer program products, and system components as illustrated in FIGS. 1-5.

FIG. 6 is a block diagram of a computing environment 600 including a computing device 610 that is operable to support embodiments of computer-implemented methods, computer program products, and system components according to the present disclosure.

The computing device 610 includes at least one processor 620 and a system memory 630. For example, the computing device 610 may be a desktop computer, a laptop computer, a tablet computer, a server, or any other fixed or mobile computing device. Depending on the configuration and type of computing device, the system memory 630 may be volatile (such as random access memory or "RAM"), non-volatile (such as read-only memory or "ROM," flash memory, and similar memory devices that maintain stored data even when power is not provided), some combination thereof, or some other memory. The system memory 630 may include an operating system 632 and program data 638. The program data 638 may include instructions to set operating parameters based on a location of a vehicle, such as the vehicle 114 of FIG. 1.

The computing device 610 may also have additional features or functionality. For example, the computing device 610 may also include removable and/or non-removable additional data storage devices, such as magnetic disks, optical disks, tape, and memory cards. Such additional storage is illustrated in FIG. 6 by a database 640. For example, the database 640 may be the geo-fence database 106 or the master database 142 of FIG. 1 and may store geo-fence data and associated rules. Computer-readable or processor-readable storage media may include volatile and/or non-volatile storage and removable and/or non-removable media implemented in any technology for storage of information such as computer-readable instructions, data structures, program components or other data. The system memory 630 and the database 640 are examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, and other non-transitory media that can be used to store information and that can be accessed by the computing device 610. Any such computer storage media may be part of the computing device 610.

The computing device 610 may also have one or more input devices, such as an external device 662 connected via one or more input interfaces 660. The external device may be the GPS receiver 102 of FIG. 1. One or more output devices, such as an illustrative display device 692, speakers, a printer, etc. may also be connected to the computing device 610 via one or more output interfaces 670. The input interfaces 660 and the output interfaces 670 may each include one or more wired or wireless interfaces, such as a universal serial bus (USB) interface, a video graphics array (VGA) interface, a serial interface, a digital visual interface (DVI), a high-definition multimedia interface (HDMI), or some other interface.

The computing device 610 has one or more communication interfaces 680 that enable the computing device 610 to communicate via a first transceiver 682 and a second transceiver 684. The first transceiver 682 may correspond to the first frequency band transmitter 110 of FIG. 1 and the second transceiver 684 may correspond to the second frequency band transmitter 112 of FIG. 1. Alternatively, the first transceiver 682 may correspond to the C-band transceiver 130 of FIG. 1 and the second transceiver 684 may correspond to the $K_a/K_u$-band transceiver 132 of FIG. 1.

Particular embodiments of disclosed techniques may be implemented in conjunction with a client-server architecture. To illustrate, the computing device 610 may be an application server or other server that hosts the satellite hub 140 of FIG. 1. A client (e.g., the satellite antenna controller 104 of FIG. 1) may operate a client computing device that transmits data to the server, where the server receives the data via the first transceiver 682 or the second transceiver 684. In response, the server may store the data in the system memory 630. Additionally, the server may transmit commands to the client computing device via the first transceiver 682 or the second transceiver 684. Alternately, the computing device 610 may represent a client computing device, such as the satellite antenna controller 104 of FIG. 1.

Alternative embodiments may be implemented in conjunction with a stand-alone architecture. For example, the computer device 610 may host the satellite antenna controller 104 of FIG. 1. The program data 638 may include instructions to compare a location received from the external device 662 (e.g., the GPS receiver 102 of FIG. 1) to a geo-fence retrieved from the database 640. The program data 638 may contain further instructions to configure operating parameters of the communication interface 680 and to select either the first transceiver 682 or the second transceiver 684 based on the comparison.

It will be appreciated that not all of the components or devices illustrated in FIG. 6 or otherwise described in the previous paragraphs are necessary to support embodiments as herein described. It will also be appreciated that the computing device 610 may have additional or different components or devices than illustrated in FIG. 6 or otherwise described in the previous paragraphs.

Although the exemplary embodiments described herein are intended to enable a person skilled in the art to practice such embodiments, it should be understood that other embodiments may be realized and that logical and physical changes may be made without departing from the scope of the present disclosure. Thus, the detailed description herein is presented for purposes of illustration only.

In one embodiment, portions of the present disclosure may be implemented using a system that includes a software module, logic engines, computer hardware, databases, and/or computer networks. Moreover, while the description may make reference to specific technologies, system architectures, and data management techniques, it will be appreciated that other devices and/or methods that use different technologies, architectures, or techniques may be implemented without departing from the scope of the disclosure. This disclosure is intended to cover any and all subsequent adaptations or variations of various embodiments.

The Abstract is not intended to be used in interpreting or limiting the scope or meaning of the claims. In addition, the disclosure is not to be interpreted as indicating that the claimed embodiments require more features than are expressly recited in each claim. Thus, the present disclosure is not intended to be limited to the embodiments shown herein but is to be accorded the widest scope possible consistent with the principles and novel features as defined by the following claims.

What is claimed is:

1. A method comprising:
    at a hub station, receiving location data from a satellite antenna controller coupled to a first frequency band satellite transmitter and to a second frequency band satellite transmitter of a vehicle;
    receiving data related to the satellite antenna controller or the vehicle while the vehicle is en route, and storing the data in a memory, wherein the data includes a location, a satellite transmission band, or any combination thereof, and wherein the data is at least one of: transmitted to a regulatory authority of a jurisdiction or received periodically;
    retrieving geo-fence data from a geo-fence database, the geo-fence data corresponding to a boundary of the jurisdiction;
    comparing the location data and the geo-fence data; and
    based on the comparison, sending at least one command to the controller based on a requirement of the jurisdiction, wherein the at least one command indicates a selection of the first band satellite frequency transmitter or the second band satellite frequency transmitter.

2. The method of claim 1, wherein the at least one command further indicates a transmit frequency, a receive frequency, a symbol rate, a modulation type, a forward error correction configuration, or any combination thereof.

3. The method of claim 1, wherein the data further includes a symbol rate, a modulation type, a forward error correction configuration, a carrier power level, or any combination thereof.

4. The method of claim 1, wherein the data is received periodically according to a time period that is determined by the regulatory authority of the jurisdiction.

5. The method of claim 1, wherein the data is received at least once per hour.

6. The method of claim 1, wherein the hub station is land based.

7. A non-transitory computer-readable medium comprising instructions that, when executed by a processor, cause the processor to perform operations including:
    receiving, at a hub station, location data from a satellite antenna controller coupled to a first frequency band satellite transmitter and to a second frequency band satellite transmitter of a vehicle;
    receiving data related to the satellite antenna controller or the vehicle while the vehicle is en route, wherein the data includes a location, a satellite transmission band, or any combination thereof;
    storing the data in memory;
    determining whether a geo-fence database of the vehicle is out of date; and
    when the geo-fence database of the vehicle is out of date, updating the geo-fence database of the vehicle from a master database.

8. The non-transitory computer-readable medium of claim 7, wherein the operations further include, validating the data after updating the geo-fence database of the vehicle.

9. The non-transitory computer-readable medium of claim 7, wherein the data further includes a symbol rate, a modulation type, a forward error correction configuration, a carrier power level, or any combination thereof.

10. The non-transitory computer-readable medium of claim 7, wherein the operations further include sending the data to a regulatory authority.

11. A system comprising:
    a hub station configured to:
        receive location data from a satellite antenna controller that is coupled to a first frequency band satellite transmitter and to a second frequency band satellite transmitter of a vehicle, wherein the hub station receives data related to the satellite antenna controller or the vehicle while the vehicle is en route, wherein the data includes a location, a satellite transmission band, or any combination thereof; and
        store the data in a memory, wherein the data is at least one of: transmitted to a regulatory authority of a jurisdiction or received periodically; and
    a geo-fence database configured to retrieve geo-fence data, the geo-fence data corresponding to a boundary of the jurisdiction, wherein the location data and the geo-fence data are compared, and based on the comparison, at least one command is sent to the satellite antenna controller based on a requirement of the jurisdiction, wherein the at least one command indicates a selection of the first band satellite frequency transmitter or the second band satellite frequency transmitter.

12. The system of claim 11, wherein the at least one command further indicates a transmit frequency, a receive frequency, a symbol rate, a modulation type, a forward error correction configuration, or any combination thereof.

13. The system of claim 11, wherein the data further includes a symbol rate, a modulation type, a forward error correction configuration, a carrier power level, or any combination thereof.

14. The system of claim 11, wherein the data is received periodically according to a time period that is determined by the regulatory authority of the jurisdiction.

15. The system of claim 11, wherein the data is received at least once per hour.

16. The system of claim 11, wherein the hub station is land based.

* * * * *